US012602912B2

(12) United States Patent
Tsushima et al.

(10) Patent No.: US 12,602,912 B2
(45) Date of Patent: Apr. 14, 2026

(54) MEMORY CAPACITY DETERMINATION SYSTEM IN LEARNING OF CELL IMAGES AND MEMORY CAPACITY DETERMINATION METHOD IN LEARNING OF CELL IMAGES

(71) Applicant: SHIMADZU CORPORATION, Kyoto (JP)

(72) Inventors: Hiroaki Tsushima, Kyoto (JP); Shuhei Yamamoto, Kyoto (JP); Takeshi Ono, Kyoto (JP); Ryuji Sawada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 334 days.

(21) Appl. No.: 18/565,884

(22) PCT Filed: Sep. 8, 2022

(86) PCT No.: PCT/JP2022/033650
§ 371 (c)(1),
(2) Date: Nov. 30, 2023

(87) PCT Pub. No.: WO2023/038074
PCT Pub. Date: Mar. 16, 2023

(65) Prior Publication Data
US 2024/0265686 A1 Aug. 8, 2024

(30) Foreign Application Priority Data
Sep. 13, 2021 (JP) ................................. 2021-148567

(51) Int. Cl.
G06V 10/776 (2022.01)
G06V 10/94 (2022.01)
G06V 20/69 (2022.01)

(52) U.S. Cl.
CPC .......... *G06V 10/776* (2022.01); *G06V 10/945* (2022.01); *G06V 20/69* (2022.01)

(58) Field of Classification Search
CPC ........ G06V 10/776; G06V 20/69; G06T 7/00; G06N 20/00; G06F 12/02; G06F 11/30
See application file for complete search history.

(56) References Cited

U.S. PATENT DOCUMENTS

2020/0184268 A1* 6/2020 Lewis .................... G06N 20/00
2021/0110536 A1 4/2021 Akazawa
(Continued)

FOREIGN PATENT DOCUMENTS

JP 2021-64115 A 4/2021
WO WO-2020001914 A1 * 1/2020 ............. G06V 20/69
(Continued)

OTHER PUBLICATIONS

WO-2020003434-A1 w/ machine English translation (Year: 2020).*
(Continued)

*Primary Examiner* — Vu Le
(74) *Attorney, Agent, or Firm* — Sughrue Mion, PLLC

(57) ABSTRACT

A memory capacity determination system (200) in learning of cell images (80) includes a learning processor (10) including a first processor (10a) configured to execute processes of training a learning model (21), and a memory (10b); a selector (45) configured to select between a training mode of training the learning model, and a validation mode of validating whether a capacity of the memory becomes insufficient; and a determiner (12d) configured to determine whether the capacity of the memory becomes insufficient in the verification mode; and a display (121) configured to give a notice based on a first determination result (32).

12 Claims, 7 Drawing Sheets

(56)                   References Cited

U.S. PATENT DOCUMENTS

2022/0245928  A1 *   8/2022   Tan ...................... G06N 3/0495
2023/0111880  A1 *   4/2023   Tsushima .............. G06T 7/0012
                                                    382/133
2023/0143489  A1 *   5/2023   Sawada .................... G06F 8/45
                                                    717/149

FOREIGN PATENT DOCUMENTS

WO       WO-2021188617  A1  *   9/2021    ........... G06V 20/695
WO       WO-2022008037  A1  *   1/2022    ............. G06N 20/00

OTHER PUBLICATIONS

JP-2019192082-A w/ machine English translation (Year: 2019).*
International Search Report for PCT/JP2022/033650 dated Nov. 1,
2022.
Written Opinion for PCT/JP2022/033650 dated Nov. 1, 2022.

* cited by examiner

VERIFICATION OF MEMORY CAPACITY

OPTIMIZATION OF 1st LEARNING CONDITIONS

MODIFIED EMBODIMENT

MEMORY CAPACITY DETERMINATION SYSTEM IN LEARNING OF CELL IMAGES AND MEMORY CAPACITY DETERMINATION METHOD IN LEARNING OF CELL IMAGES

CROSS REFERENCE TO RELATED APPLICATIONS

This application is a National Stage of International Application No. PCT/JP2022/033650 filed Sep. 8, 2022, claiming priority based on Japanese Patent Application No. 2021-148567 filed Sep. 13, 2021.

TECHNICAL FIELD

The present invention relates to a memory capacity determination system in learning of cell images and a memory capacity determination method in learning of cell images.

BACKGROUND ART

Techniques for producing a learning model for analyzing cell images are disclosed in the art. Such a technology for producing a learning model for analyzing cell images is disclosed in Japanese Patent Laid-Open Publication No. JP 2021-64115, for example.

Japanese Patent Laid-Open Publication No. JP 2021-64115 discloses a configuration in which a machine learning model is produced by performing machine learning using learning data including cell images as input images and stained images acquired by staining cytoskeletons,

PRIOR ART

Patent Document

Patent Document 1: Japanese Patent Laid-Open Publication No. JP 2021-64115

SUMMARY OF THE INVENTION

Problems to be Solved by the Invention

Although is not stated in Japanese Patent Laid-Open Publication No. JP 2021-64115, machine learning is performed by using a processor such as a GPU (Graphics Processing Unit) and a memory that serves as a working area in leaning. If the machine learning is successfully completed, the learned model is produced. On the other hand, if the machine learning abnormally ends, data used for the learning and the learning conditions are changed and the machine learning is then performed again. Insufficient memory capacity in the learning can be considered as a cause of abnormal ending of machine learning. In such a configuration in which machine learning is performed disclosed in Japanese Patent Laid-Open Publication No. JP 2021-64115, users cannot grasp the insufficient memory capacity, which causes abnormal ending of machine learning. For this reason, a technique for allowing users to grasp such insufficient memory capacity that causes abnormal ending of machine learning.

The present invention is intended to solve the above problem, and one object of the present invention is to provide a memory capacity determination system in learning of cell images and a memory capacity determination method in learning of cell images capable of allowing users to grasp insufficient memory capacity that causes abnormal ending of machine learning.

Means for Solving the Problems

In order to attain the aforementioned object, a memory capacity determination system in learning of cell images according to a first aspect of the present invention includes a learning processor including a processor configured to execute a predetermined number of processes of training a learning model by using cell images under a first learning condition(s), and a memory configured to be used as a working area for executing processes of training the learning model; a selector configured to select between a training mode of training the learning model by executing processes of training by using the learning processor, and a validation mode of validating whether a capacity of the memory becomes insufficient in a process(es) of training by using the learning processor; a determiner configured to determine whether the capacity of the memory becomes insufficient in the process(es) of training the learning model in the verification mode; and an informer configured to give a notice based on a determination result of the determiner.

A memory capacity determination method in learning of cell images according to a second aspect of the present invention includes a step of executing a predetermined number of processes of training a learning model by using cell images under a first learning condition(s); a step of selecting between a training mode of training the learning model by executing processes of training the learning model, and a validation mode of validating whether a capacity of a memory used as a working area becomes insufficient in a process(es) of training the learning model; a step of determining whether the capacity of the memory becomes insufficient in the process(es) of training the learning model; and a step of giving a result of the determination whether the capacity of the memory becomes insufficient.

Effect of the Invention

In the memory capacity determination system in learning of cell images according to the first aspect and the memory capacity determination method in learning of cell images according to the second aspect, in a validation mode of validating whether a capacity of a memory used as a working area becomes insufficient in a process(es) of training the learning model, it is determined whether the capacity of the memory becomes insufficient. The capacity of memory allocated as a working area is equal in both the training mode and the verification mode. Accordingly, it can be determined whether the capacity of the memory becomes insufficient for the training mode by validating whether the capacity of the memory used as a working area becomes insufficient in the verification mode. In addition, a result of the determination whether the capacity of the memory becomes insufficient is given. Accordingly, users can validate whether the capacity of the memory used as a working area becomes insufficient in the verification mode before training the learning model in the training mode, and can grasp whether the capacity of the memory used as a working area becomes insufficient before training the learning model in the learning mode. As a result, users can grasp insufficient memory capacity that causes abnormal ending of machine learning. In addition, because the training mode or the verification mode can be selected, it is possible to train the learning model in the training mode without executing training processing in the verification mode in a case in which it is unnecessary to validate whether the capacity of the memory used as a working area becomes insufficient in the verification mode. Consequently, user usability can be improved.

MODES FOR CARRYING OUT THE INVENTION

Embodiments embodying the present invention will be described with reference to the drawings.

The following description describes a memory capacity determination system 200 in learning of cell images 80 including an image processing apparatus 100, and a memory capacity determination method in learning of cell images 80 according to an embodiment with reference to FIGS. 1 to 7.

<Image Processing System>

Figure 1:
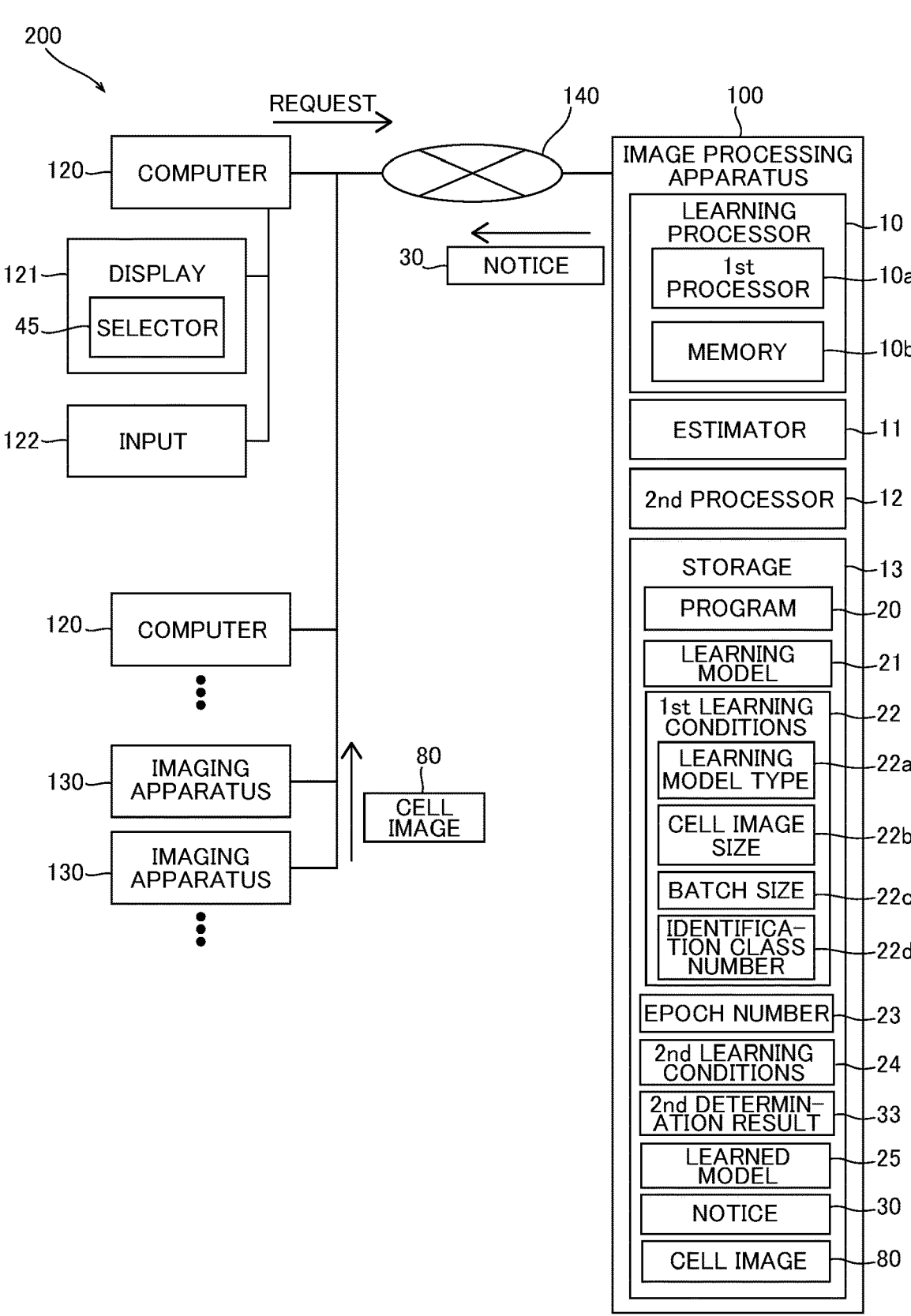
FIG. 1 is a block diagram a memory capacity determination system including an image processing apparatus according to an embodiment.

The memory capacity determination system 200 in learning of cell images 80 shown in FIG. 1 can determine whether a capacity of a memory 10b becomes insufficient when a learning model 21 for analysis of cell images 80 captured by users who culture cells, etc. is trained.

<Schematic Configuration of Memory Capacity Determination System>

The memory capacity determination system 200 in learning of cell images 80 includes an image processing apparatus 100, a computer 120, and an imaging apparatus 130.

The memory capacity determination system 200 shown in FIG. 1 is illustratively constructed of a client-server model. The computer 120 serves as a client terminal in the memory capacity determination system 200. The image processing apparatus 100 serves as a server in the memory capacity determination system 200. The image processing apparatus 100, the computer 120, and the imaging apparatus 130 are connected through a network 140, and can communicate with each other through the network. The image processing apparatus 100 performs various types of information processing in response to requests (processing requests) from the computer 120 operated by the user. The image processing apparatus 100 trains the learning model 21 for analysis of cell images 80 in response to a request. In this embodiment, the image processing apparatus 100 trains the learning model 21 to classify cells included in the cell images 80. For example, the image processing apparatus 100 trains the learning model 21 to classify whether the cells included in the cell images 80 are normal or abnormal cells, and whether the cells included in the cell images 80 are aged.

Also, the image processing apparatus 100 determine whether the capacity of the memory 10b becomes insufficient when the learning model 21 for analysis of cell images 80 is trained in response to a request. Also, the image processing apparatus 100 is configured to give a notice 30 to the computer 120 depending on a result of determination whether the memory 10b is insufficient. A graphical user interface (GUI) is displayed on a display 121 of the computer 120, and is configured to accept instructions provided to the image processing apparatus 100 and to display analysis results analyzed by the image processing apparatus 100 and images after the analysis.

Network 140 connects the image processing apparatus 100, the computer 120, and the imaging apparatus 130 to communicate with each other. Network 140 could be, for example, a local area network (LAN) built within a facility. Network 140 could be, for example, the Internet. In a case in which the network 140 is the Internet, the memory capacity determination system 200 in learning of cell images 80 can be a system configured in a cloud computing form.

The computer 120 is a so-called personal computer, equipped with a processor and storage. The display 121 and input 122 are connected to the computer 120. The display 121 is, for example, a liquid crystal display device. The display 121 may be an electro-luminescence display, a projector or a head-mounted display. For example, the input 122 is an input device including a computer mouse and a key-board. The input 122 may be a touch panel. The memory capacity determination system 200 in learning of cell images 80 can include one or more computers 120. In this embodiment, the display 121 is configured to configured to give a notice based on a first determination result 32 of a determiner 12d (see FIG. 3), which will be described later. Also, the display 121 displays a selector 45, which will be described later. The display 121 is an example of an "informer" in the claims.

The Imaging apparatus 130 is configured to generate the cell images 80. The imaging apparatus 130 can send the generated cell images 80 to the computer 120 and/or the image processing apparatus 100 through the network 140. The imaging apparatus 130 is configured to capture microscopic images of cells. The imaging apparatus 130 can use imaging methods such as bright-field observation, dark-field observation, phase contrast observation, and differential interference observation, etc. for imaging. One or more of the imaging apparatuses 130 are used in accordance with imaging methods. The memory capacity determination system 200 in learning of cell images 80 can include one or more imaging apparatuses 130.

The image processing apparatus 100 includes a learning processor 10, an estimator 11, a second processor 12, and a storage 13.

The learning processor 10 includes a first processor 10a and a memory 10b.

The first processor 10*a* is configured to execute a predetermined number of processes of training the learning model 21 by using cell images 80 under first learning conditions 22. The first processor 10*a* includes a processor such as GPU or FPGA (Field-Programmable Gate Array) configured for image processing, for example. In this embodiment, the first processor 10*a* is illustratively constructed of a GPU.

The memory 10*b* is used as a working area for processes of training the learning model 21. The memory 10*b* includes, for example, a RAM (Random Access Memory).

The estimator 11 is configured to estimate the cell images 80 by using a learned model 25. The estimator 11 includes, for example, a GPU, or an FPGA configured for image processing.

The second processor 12 includes a CPU (Central Processing Unit), an FPGA, and an ASIC (Application Specific Integrated Circuit), etc. The image processing apparatus 100 is configured to perform arithmetic processing by using the second processor 12 by executing a predetermined program 20.

The storage 13 includes a non-volatile storage device. For example, the non-volatile storage device is a hard disk drives, solid state drives, etc. The storage 13 is configured to store various programs 20 to be executed by the second processor 12. The storage 13 is configured to also store an epoch number 23, which is the number of processes of training the leaning model to be repeatedly executed by the learning processor 10 in the learning mode. The storage 13 is configured to store second learning conditions 24 under which the processes of training were executed in a verification mode, and second determination results 33 corresponding to the second learning conditions 24. Also, the storage 13 is configured to store notices 30. Also, the storage 13 is configured to store the cell images 80.

The selector 45 is configured to select between a training mode of training the learning model 21 by executing processes of training by using the learning processor 10, and a validation mode of validating whether a capacity of the memory 10*b* becomes insufficient in a process of training by using the learning processor 10. The selector 45 is a press button on the GUI displayed on the display 121. The selector 45 will be described later.

The image processing apparatus 100 is configured to train the learning model 21 for analysis of cell images 80, which are stored in the storage 13, in response to a request from the computer 120. Specifically, the learning processor 10 included in the image processing apparatus 100 is configured to train the learning model 21.

The image processing apparatus 100 trains the learning model 21 by executing processes of training in the training mode in response to a request from a user. Specifically, in the training mode, the learning processor 10 execute a predetermined number (epoch number 23) of processes of training under the first learning condition 22 in the training mode. The processes of training in the training mode are executed by the learning processor 10.

Figures 2, 3:
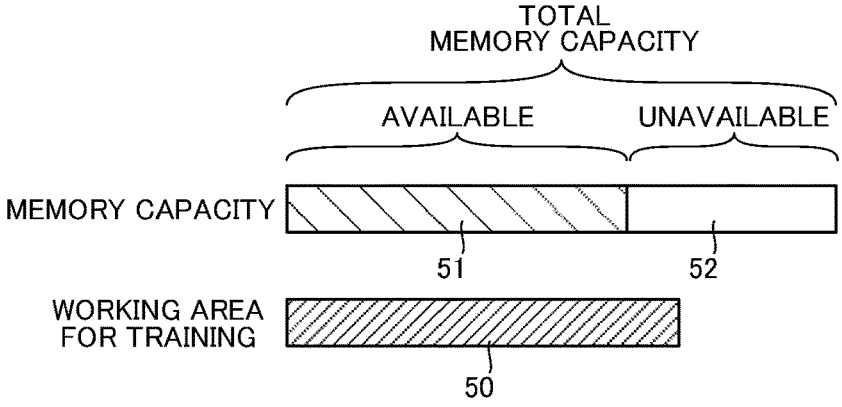
FIG. 2 is a schematic view illustrating a working area in learning and a memory capacity.
FIG. 3 is a functional block diagram functions of a second processor of the image processing apparatus.

As shown in FIG. 2, when the learning processor 10 executes the processes of training the learning model 21, the memory 10*b* is used as the working area 50, The memory 10*b* includes an available capacity 51, and an unavailable capacity 52 that is used by other programs and cannot be used for the processes of training. When the learning processor 10 executes the processes of training the learning model 21, if a capacity allocated for the working area 50 is greater than the available capacity 51, a capacity of the memory 10*b* becomes insufficient (out of memory), and as a result the process of training the learning model 21 abnormally ends.

To address this, in this embodiment, the image processing apparatus 100 executes a process(es) of training in a verification mode to determine whether a capacity of the memory 10*b* is insufficient when training the learning model 21. The number the process(es) of training in the verification mode is smaller than the number of processes of training in the learning mode. Specifically, in the verification mode, one process of training is executed. The image processing apparatus 100 is configured acquire the notice 30 (see FIG. 1) based on a result of determination whether a capacity the memory 10*b* is insufficient. The image processing apparatus 100 sends the acquired notice 30 to the computer 120 (see FIG. 1). The computer 120 that receives the notice 30 displays the notice 30 on the display 121 (see FIG. 1). The process of training in the learning model 21 and the process of training in the verification mode are not executed in parallel. In other words, the image processing apparatus 100 can execute only one of the process of training in the learning mode and the process of training in the verification mode.

<Determination by Second Processor>

As shown in FIG. 3, the second processor 12 includes a learning condition register 12*a*, a learning condition changer 12*b*, an image size increaser 12*c*, a determiner 12*d* and a notice acquirer 12*e* as functional blocks. In other words, the second processor 12 serves as the learning condition register 12*a*, the learning condition changer 12*b*, the image size increaser 12*c*, the determiner 12*d* and the notice acquirer 12*e* by executing the programs 20 stored in the storage 13.

The learning condition register 12*a* is configured to register the first learning conditions 22. The term to register the first learning conditions 22 refers to that to acquire the first learning conditions 22 provided by a user through the input 122 by using the learning condition register 12*a* and to store the acquired first learning conditions 22 into the storage 13. The learning condition register 12*a* is configured to provide the first learning conditions 22 to the learning processor 10. Also, the learning condition register 12*a* is configured to provide the first learning conditions 22 to the determiner 12*d*.

The first Learning conditions 22 includes a type 22*a* (see FIG. 1) of learning model 21, a batch size 22*c* (see FIG. 1) of the cell images 80 used to train the learning model 21, sizes 22*b* (see FIG. 1) of the cell images 80, and the number of identification classes 22*d* (see FIG. 1) to which the learning model 21 learns to classify the cell image. The batch size 22*c* refers to the number of the cell images 80 used to train the learning model 21. Type 22*a* of the learning model 21 refers to a classification type of an algorithm of the learning model 21. The number of identification classes 22*d* is the number of classes to which the cell images 80 are be classified. The batch size 22*c* of the cell images 80 is an example of "the number of the cell images" of the claims.

The learning condition changer 12*b* is configured to change a condition(s) of the first learning conditions 22. In this embodiment, the learning condition changer 12*b* is configured to change the batch size 22*c* of the cell images 80 in the first learning conditions 22. The learning condition changer 12*b* is configured to provide first learning conditions 222 after the changing to the learning processor 10. The learning condition changer 12*b* is configured to stores the first learning conditions 222 after the changing into the storage 13. Also, the learning condition changer 12*b* is configured to provide the first learning conditions 222 after the changing to the determiner 12d. Here, the learning condition changer 12b changes the condition of the learning 22 first conditions in optimization of the first learning conditions 22, which will be described later. In other words, the learning condition changer 12b does not change the condition of the first learning conditions 22 in a first process of training in the verification mode.

In this embodiment, in order to increase a load of the memory 10b in the process of training in the verification mode, and to increase a capacity allocated for the working area 50 (see FIG. 2), the image size increaser 12c is configured to the size 22b of the cell image 80. The image size increaser 12c is configured to increase a size of the cell image 80 to 1.1 to 1.2 times the size, for example. The image size increaser 12c provides a cell image 80a having an increased size to the learning processor 10. The image size increaser 12c is configured to increase the size of the cell image 80 only in the verification mode. In other words, the image size increaser 12c does not increase the size of the cell image 80 in the learning mode.

The learning processor 10 executes the process of training in the verification mode by using the first learning conditions 22 provided from the learning condition register 12a, the cell images 80a having an increased size provided from the image size increaser 12c, and the learning model 21. In other words, the learning processor 10 is configured to execute the process of training in the verification mode by using the cell image 80a the size of which is increased by the image size increaser 12c. In this embodiment, the learning processor 10 is configured to execute, in verification mode, the process(es) of training the number of which is smaller than the number of processes of training in the learning mode. Specifically, the learning processor 10 is configured to execute a single process of training in the verification mode.

Also, the learning processor 10 is configured to provide information 31 at the end of the process of training when the process of training is executed in the verification mode to the determiner 12d. The Information 31 at the end of the process of training is information on a status when the process of training in the verification mode ends. Specifically, when the process of training in the verification mode normally ends, the learning processor 10 provides the information on the status of the normal ending of the process of training in the verification mode as information 31 on ending of the process of training to the determiner 12d. On the other hand, when the process of training in the verification mode is executed, if it abnormally ends, the learning processor 10 provides the information on the status of the abnormal ending of the process of training in the verification mode as information 31 on ending of the process of training to the determiner 12d. In addition, if the process of training in the verification mode abnormally ends, the learning processor 10 provides log information on the abnormal ending to the determiner 12d.

The determiner 12d is configured to determine whether a capacity of the memory 10b becomes insufficient in the processes of training the learning model 21 in the verification mode. Specifically, the determiner 12d is configured to determine whether a capacity of the memory 10b becomes insufficient based on the information 31 on the end of the process of training provided from the learning processor 10. In other words, if receiving information on the status of the normal ending of the process of training in the verification mode as the information 31 on the end of the learning process, the determiner 12d determines that the capacity of the memory 10b is not insufficient.

Contrary to this, if receiving information on the status of the abnormal ending of the process of training in the verification mode as the information 31 on the end of the learning process, the determiner 12d acquires the log information on the abnormal ending to determine whether the capacity of the memory 10b is insufficient. Specifically, the determiner 12d determines whether the capacity of the memory 10b is insufficient based on whether the log information on the abnormal ending includes information indicating that the capacity of the memory 10b is insufficient. The determiner 12d provides a first determination result 32 that a result of determination whether the capacity of the memory 10b is insufficient to the notice acquirer 12e. The first determination result 32 includes information on a status that out-of-memory does not occur so that the process of training in the verification mode normally ends, and information on a status that out-of-memory occurs so that the process of training in the verification mode abnormally ends. The determiner 12d is configured to determine whether a capacity of the memory 10b is insufficient only in the verification mode, and does not execute the determination in the learning mode.

The notice acquirer 12e is configured to acquire the notice 30 that is stored in the storage 13 based on the first determination result 32. The notice 30 includes a message 30a indicating verification that no out-of-memory occurs (see FIG. 5) and a message 30b indicating verification that out-of-memory occurs (see FIG. 7). If no out-of-memory occur, the notice acquirer 12e receives the message 30a indicating verification that no out-of-memory occurs as the notice 30. On other hand, if out-of-memory occurs, the notice acquirer 12e receives the message 30b indicating verification that out-of-memory occurs as the notice 30. The notice acquirer 12e provides the notice 30 to the display 121. In the training mode, the notice acquirer 12e acquires a message indicating that the process of training the learning model 21 normally ends or a message indicating that the process of training the learning model abnormally ends as the notice 30. In other words, in the training mode, the notice acquirer 12e does not acquire the notice 30 indicating whether out-of-memory occurs.

The display 121 is configured to inform whether a capacity of the memory 10b becomes insufficient based on the provided notice 30 when the process of training in the verification mode is executed. Specifically, the display 121 is configured to display the notice 30 provided from the notice acquirer 12e.

In a case in which the process of training in the verification mode was executed under the same second learning conditions 24 as the first learning conditions 22, the same the result of determination whether a capacity of the memory 10b becomes insufficient in the process of training in the verification mode under second learning conditions 24 as the result under the first learning conditions 22 is expected. In this embodiment, the determiner 12d is configured to determine whether the same conditions as the first learning conditions 22 are stored as the second learning conditions 24 in the storage 13. Also, the learning processor 10 is configured not to execute the process(es) of training under the first learning conditions 22 in the verification mode if the same conditions as the first learning conditions 22 are stored as the second learning conditions 24 in the storage 13. The second learning conditions 24 are the first learning conditions 22 that were used for verification. In other words, the second learning conditions 24 include a type of the learning model 21, a type of cell image 80, a batch size, and the number of identification classes. A term that the first learning conditions 22 are the same as the second learning conditions 24 refers that all of the type of the learning model 21, the type of cell image 80, the batch size, and the number of identification classes included in the first learning conditions 22 are those included in the second learning conditions 24.

The notice acquirer 12e is configured to acquire, if the same conditions as the first learning conditions 22 are stored as the second learning conditions 24 in the storage 13, a second determination result 33 corresponding to the second learning conditions 24 that are same as the first learning conditions. Also, the notice acquirer 12e is configured to acquire the notice 30 based on the second determination result 33 and to then provide the acquired notice 30 to the display 121. The second determination result 33 includes the same result as the first determination result 32. In other words, the notice acquirer 12e is configured to acquire, if the same conditions as the first learning conditions 22 are stored as the second learning conditions 24 in the storage 13, the notice 30 based on the second determination result 33 by using the same configuration as a configuration in which the notice 30 is acquired based on the first determination result 32.

The display 121 is configured to display, if the same conditions as the first learning conditions 22 are stored as the second learning conditions 24 in the storage 13, the second determination result 33 corresponding to the second learning conditions 24 that are same as the first learning conditions. Specifically, the display 121 is configured to display the notice 30 that is acquired by the notice acquirer 12e based on the second determination result 33 and is provided to the display 121.

In this embodiment, the estimator 11 (see FIG. 1) is configured to use the memory 10b to execute, when the processes of training are executed by the learning processor 10 in the verification mode, processing of estimation of the cell image 80 by using a learned model 25 (see FIG. 1) that has learned in parallel to the processes of training executed by the learning processor 10. In this embodiment, the processing of estimation is also executed in the working area 50 used for the process of training in the verification mode. In other words, a capacity of the memory 10b allocated for the working area 50 includes an area of the memory 10b for the process of training in the verification mode and an area of the memory 10b for estimation. In this embodiment, the model with the memory 10b having a larger capacity prepared for processing is selected as the learned model 25 for the processing of estimation. For example, the processing of estimation is a process of classifying the cells included in the cell estimating classification that classifies each cell image 80 into one of classes.

<Optimization of First Learning Conditions>

A capacity of the working area 50 (see FIG. 2) used when the process of training in the verification mode is executed varies according to the first Learning conditions 22. For this reason, all the available capacity 51 of the memory 10b cannot be allocated for the working area 50 depending on the first learning conditions 22. That is, even in a case in which the first learning conditions 22 are changed to increase a capacity of the memory 10b allocated for the working area 50, when the process of training is executed in the verification mode, the remaining capacity of the available capacity 51 of the memory 10b is sufficient to avoid out-of-memory may in some cases.

When the process of training is executed in the verification mode, if out-of-memory occurs in the memory 10b, the user adjusts the first Learning conditions 22 to change the first learning conditions 22 to other first learning conditions 22 that avoids out-of-memory. However, if the user manually changes the first learning conditions 22, and repeats the process of training in the verification mode to acquire optimal first learning conditions 22, a burden on the user is large.

To address this, in this embodiment, the learning processor 10 is configured to repeatedly execute the process of training in the validation mode while the learning condition changer 12b changes one or more of the first learning conditions 22. In other words, in this embodiment, the first learning conditions 22 can be optimized by the learning processor 10 and the learning condition changer 12b. In this embodiment, the learning processor 10 is configured to repeatedly execute the process of training in the validation mode while the learning condition changer 12b changes the batch size 22c, for example. The first learning conditions 22 are optimized by operating inputs from the user.

The learning processor 10 is configured to repeatedly execute the process of training in the validation mode while increasing the batch size 22c if no out-of-memory occurs in the process of training in the verification mode. The learning processor 10 is configured to repeatedly execute the process of training in the validation mode while reducing the batch size 22c if out-of-memory occurs in the process of training in the verification mode.

Also, the determiner 12d is configured to acquire the optimal learning conditions for preventing that the capacity of the memory 10b becomes insufficient as optimal first learning conditions 22 based on the first determination result 32. The determiner 12d is configured to acquire the maximum batch size 22c of the cell images 80 for preventing that the capacity of the memory 10b becomes insufficient as the optimal first learning conditions 22.

<Screen of Process of Training in Verification Mode>

A configuration of the image processing apparatus 100 that executes the process of training in the verification mode according to this embodiment is now described with reference to FIGS. 4 to 7.

An exemplary screen when the process of training is successfully executed in the verification mode is first described with reference to FIGS. 4 and 5.

Figure 4:
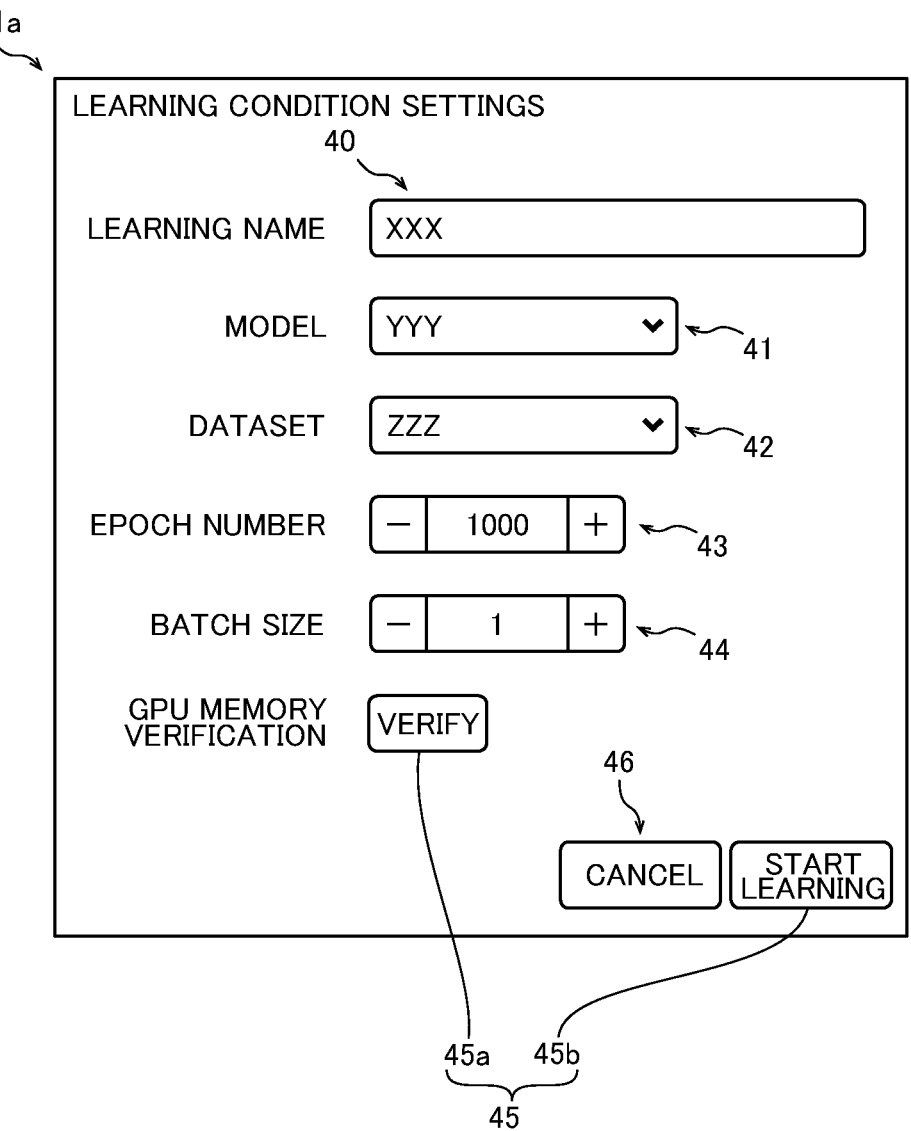
FIG. 4 is a view illustrating an exemplary screen in a case in which memory capacity is not insufficient in a process of training in a validation mode in the image processing apparatus according to this embodiment.

FIG. 4 is a view illustrating a learning condition setting screen 111a displayed on the display 121 (see FIG. 1). The displayed learning condition setting screen 111a includes a learning name input field 40, a model selection field 41, a dataset selection field 42, an epoch number input field 43, a batch size input field 44, a verification button 45a, a learning-start button 45b, and a cancel button 46.

The learning name input field 40 is an input field for entering a learning name. The model selection field 41 is a selection field for selecting the learning model 21 (see FIG. 1). The dataset selection field 42 is a selection field for selecting a dataset to be used for training the learning model 21. The epoch number input field 43 is an input field for entering the epoch number 23. The batch size input field 44 is an input field for entering the batch size 22c. The verification button 45a is a press button on the GUI for starting the process of training in the verification mode. The learning-start button 45b is a press button on the GUI for starting the process of training in the learning mode. The cancel button 46 is a press button on the GUI for canceling the process of training.

A type 22a of the learning model 21 in the first learning conditions 22 (see FIG. 1) is specified by selecting the learning model 21 in the model selection field 41 (see FIG. 1). Also, a size 22b (see FIG. 1) of the cell image 80 (see FIG. 1) in the first learning conditions 22 and the number of identification classes 22d (see FIG. 1) are specified by selecting a dataset in the dataset selection field 42. Also, the batch size 22c in the first learning condition 22 (see FIG. 1) is specified in accordance with a batch size value that is entered in the batch size input field 44. The epoch number 23 that is entered in the epoch number input field 43 (see FIG. 1) is specified as the epoch number when the learning model is trained in the learning mode. In other words, the epoch number 23 that is entered in the epoch number input field 43 is not used in the process of training in the validation mode.

When the verification button 45a is pressed, the process of training in the verification mode is executed under the first learning conditions 22 that are specified.

Figure 5:
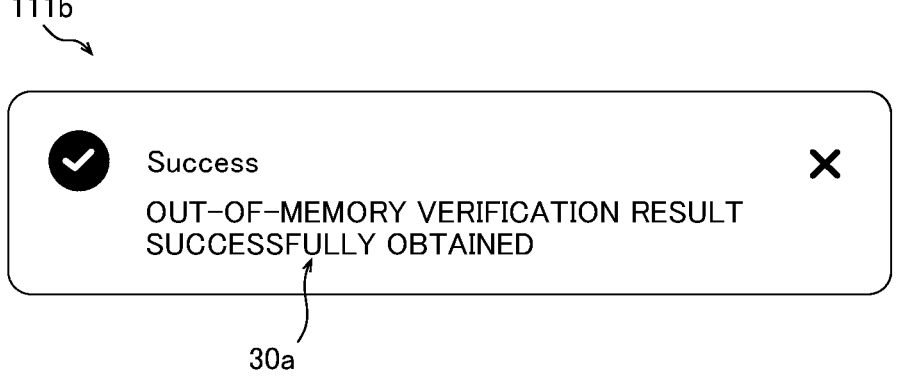
FIG. 5 is a view illustrating an exemplary screen in a case in which memory capacity is not insufficient in the process of training in the validation mode.

In the process of training in the verification mode, if the process of training normally ends without out-of-memory, the display 121 displays a verification result notification screen 111b shown in FIG. 5. Specifically, the display 121 displays the notice 30 that is sent from the image processing apparatus 100 as the verification result notification 111b. In the verification result notification screen 111b, the message 30a is displayed indicating that that no out-of-memory occurs. The display 121 displays the verification result notification screen 111b as a pop-up message, for example, on the learning condition setting screen 111a shown in FIG. 4.

An exemplary screen when the process of training fails in the verification mode is now described with reference to FIGS. 6 and 7.

Figure 6:
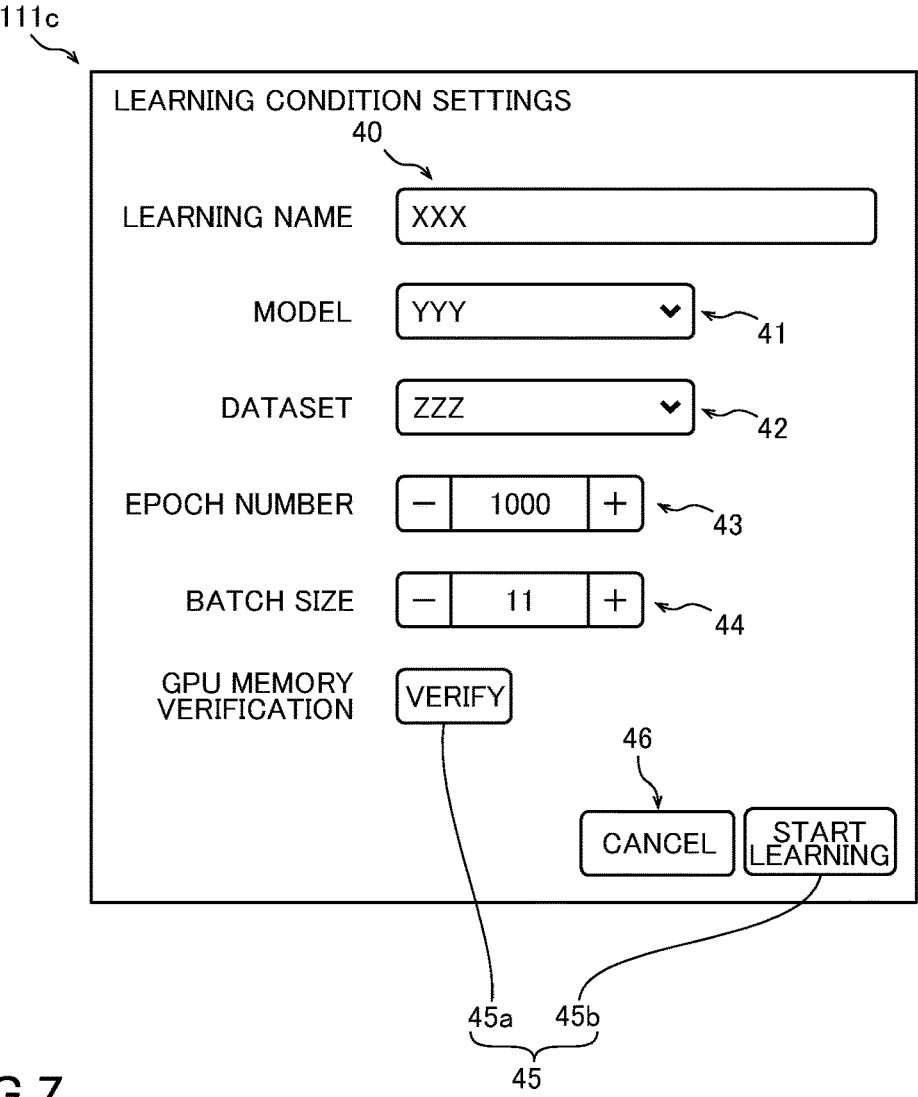
FIG. 6 is a view illustrating an exemplary screen in a case in which memory capacity is insufficient in the process of training in the validation mode.

The learning condition setting screen 111c shown in FIG. 6 is the same screen as the learning condition setting screen 111a shown in FIG. 4 except that the different batch sizes 22c are entered in the batch size input field 44. In the exemplary screen shown in FIG. 6, an exemplary entered batch size 22c when out-of-memory occurs in the training process in the verification mode is "11".

Figure 7:
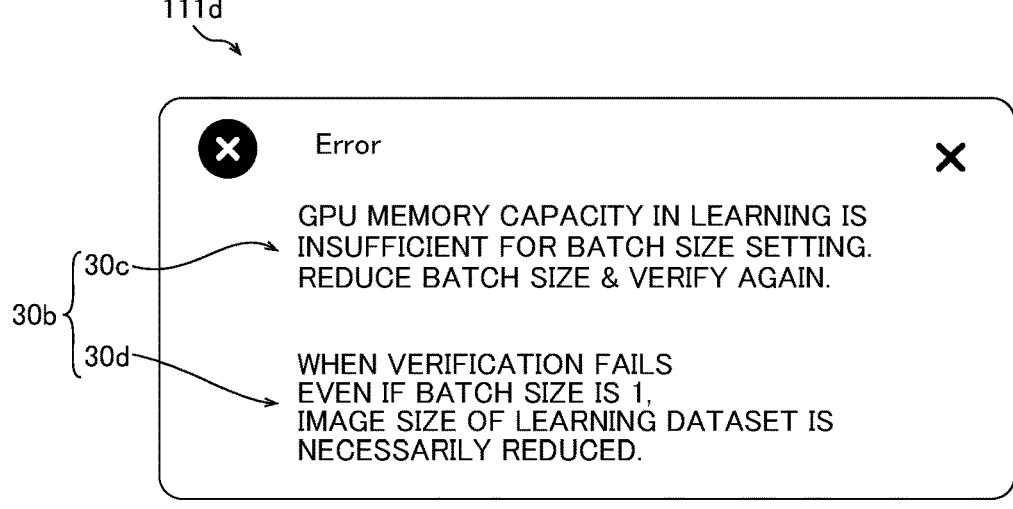
FIG. 7 is a view illustrating an exemplary screen in a case in which memory capacity is insufficient in the process of training in the validation mode.

When the verification button 45a is pressed in the learning condition setting screen 111c, the display 121 displays the verification result notification screen 111d as shown in FIG. 7. Specifically, the display 121 displays the notice 30 that is sent from the image processing apparatus 100 as the verification result notification screen 111d. In the verification result notification screen 111d, the message 30b is displayed indicating that that out-of-memory occurs. The message 30b indicating that that out-of-memory occurs includes information 30c that urges the user to reduce the batch size 22c and information 30d that urges the user to reduce the size 22b of the cell image 80. That is, the display 121 is configured to give information 30c that urges the user to reduce the batch size 22c of the cell image 80 in the first learning conditions 22 if the capacity of the memory 10b becomes insufficient. Also, the display 121 is configured to give additional information 30d that urges the user to reduce the size 22b of the cell image 80 in the first learning conditions 22 if the capacity of the memory 10b becomes insufficient.

Figure 8:
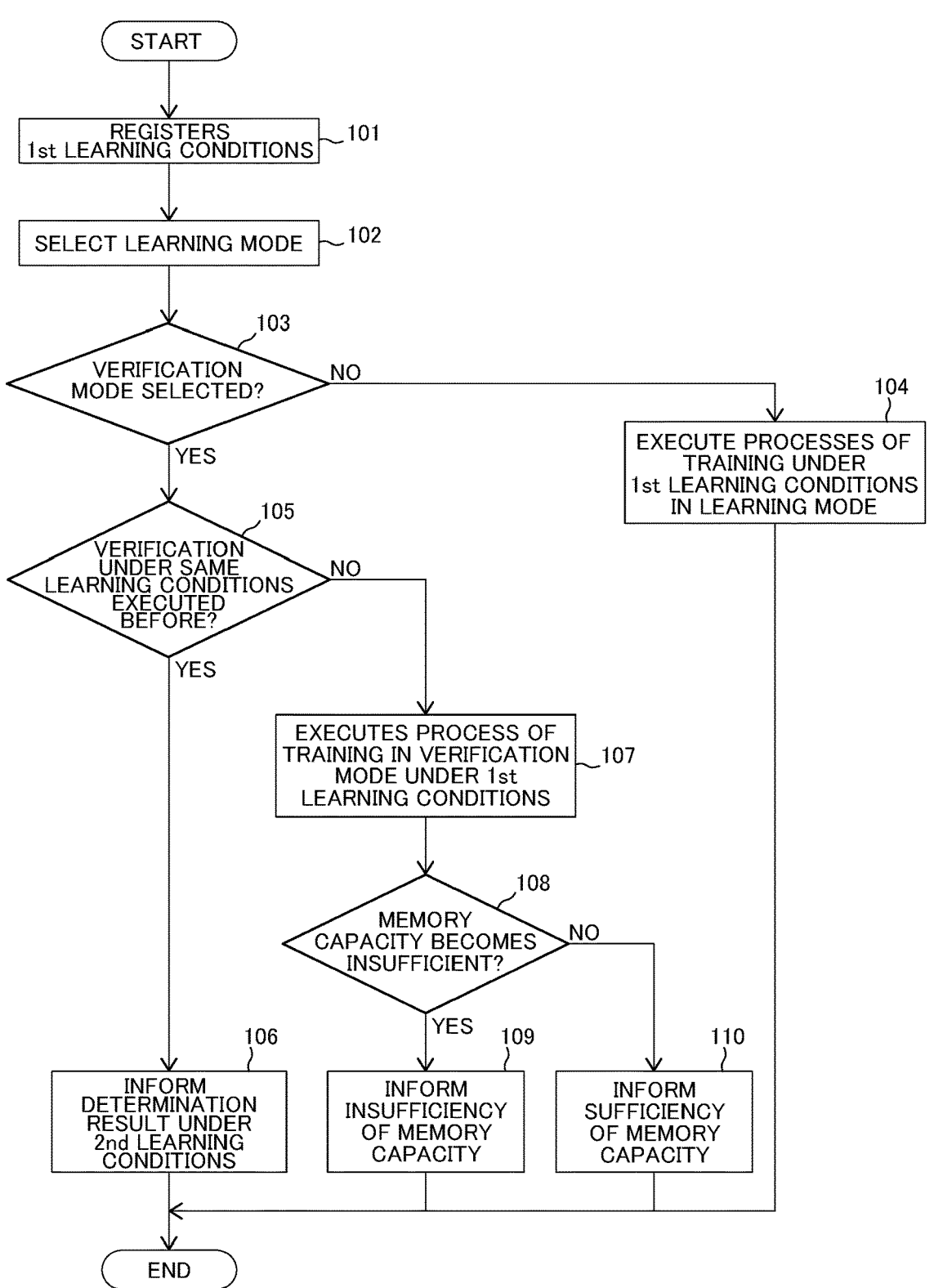
FIG. 8 is a flowchart illustrating processes of memory capacity verification in the image processing apparatus according to this embodiment.

The following description describes processes of memory capacity verification in the memory capacity determination method in learning of the cell images 80 according to this embodiment with reference to FIG. 8.

In step 101, the learning condition register 12a (see FIG. 3) registers the first learning conditions 22. Specifically, the learning condition register 12a stores the first learning conditions 22 specified in the learning condition setting screen 111a (see FIG. 4) into the storage 13 (see FIG. 1).

In step 102, a learning mode is selected. Specifically, the second processor 12 (see FIG. 1) selects between the training mode of training the learning model 21 (see FIG. 1) by executing processes of training the learning model 21, and the validation mode of validating whether a capacity of the memory 10b (see FIG. 1) used as the working area becomes insufficient in the processes of training the learning model 21 based on an operating input that is provided through the selector 45 (see FIG. 4). More specifically, the second processor 12 selects the verification mode when the verification button 45a (see FIG. 4) is pressed. Also, the second processor 12 selects the training mode when the learning-start button 45b (see FIG. 4) is pressed.

In step 103, the second processor 12 (see FIG. 1) determines whether the verification mode is selected. If the verification mode is not selected, the procedure goes to step 104. If the validation mode is selected, the procedure goes to step 105.

In step 104, the learning processor 10 (see FIG. 1) executes the processes of training in the learning mode. Specifically, the learning processor 10 executes a predetermined number (epoch number 23) of processes of training the learning model 21 by using the cell images 80 under the first learning conditions 22. After that, the procedure ends. The predetermined number (epoch number 23) is a value that is entered in the epoch number input field 43 on the learning condition setting screen 111a (see FIG. 4).

If the procedure goes from step 103 to step 105, in step 105, the determiner 12d (see FIG. 3) determines whether verification under the same learning conditions was executed. Specifically, the determiner 12d determines whether the second learning conditions 24 (see FIG. 1) same as the first learning conditions 22 (see FIG. 1) are stored in the storage 13 (see FIG. 1). If the same second learning conditions 24 as the first learning conditions 22 are stored in the storage 13, the procedure goes to step 106. If the same second learning conditions 24 as the first learning conditions 22 are not stored in the storage 13, the procedure goes to step 107.

In step 106, the display 121 displays the second determination under the second learning conditions 24. After that, the procedure ends.

If the procedure goes from step 105 to step 107, in step 107, the learning processor 10 executes the process of training in the verification mode under the first learning conditions 22. In this embodiment, the estimator 11 is executes the processing of estimation of the cell image 80 in parallel to the process of training in the verification mode in step 107. In this embodiment, the process of training in the verification mode is executed once regardless of the value that is entered in the epoch number input field 43 on the learning condition setting screen 111a (see FIG. 4).

In step 108, the determiner 12d determines whether a capacity of the memory 10b (see FIG. 1) becomes insufficient in the processes of training the learning model 21 in the verification mode. Specifically, the determiner 12d determines whether the capacity of the memory 10b becomes insufficient based on the information 31 on the end of the process of training (see FIG. 3). If the capacity of the memory 10b becomes insufficient, the procedure goes to step 109. If the capacity of the memory 10b does not become insufficient, the procedure goes to step 110.

In step 109, the display 121 displays the first termination result 32 whether the capacity of the memory 10b becomes insufficient. In step 109, the display 121 notifies that the capacity of the memory 10b becomes insufficient. Specifically, the display 121 displays the verification result notification screen 111d (see FIG. 7) whereby notifying that the capacity of the memory 10b becomes insufficient. After that, the procedure ends.

If the procedure goes from step 108 to step 110, in step 110, the display 121 notifies that the capacity of the memory 10*b* is sufficient. Specifically, the display 121 displays the verification result notification screen 111*b* (see FIG. 5) whereby notifying that the capacity of the memory 10*b* is sufficient. After that, the procedure ends.

Figure 9:
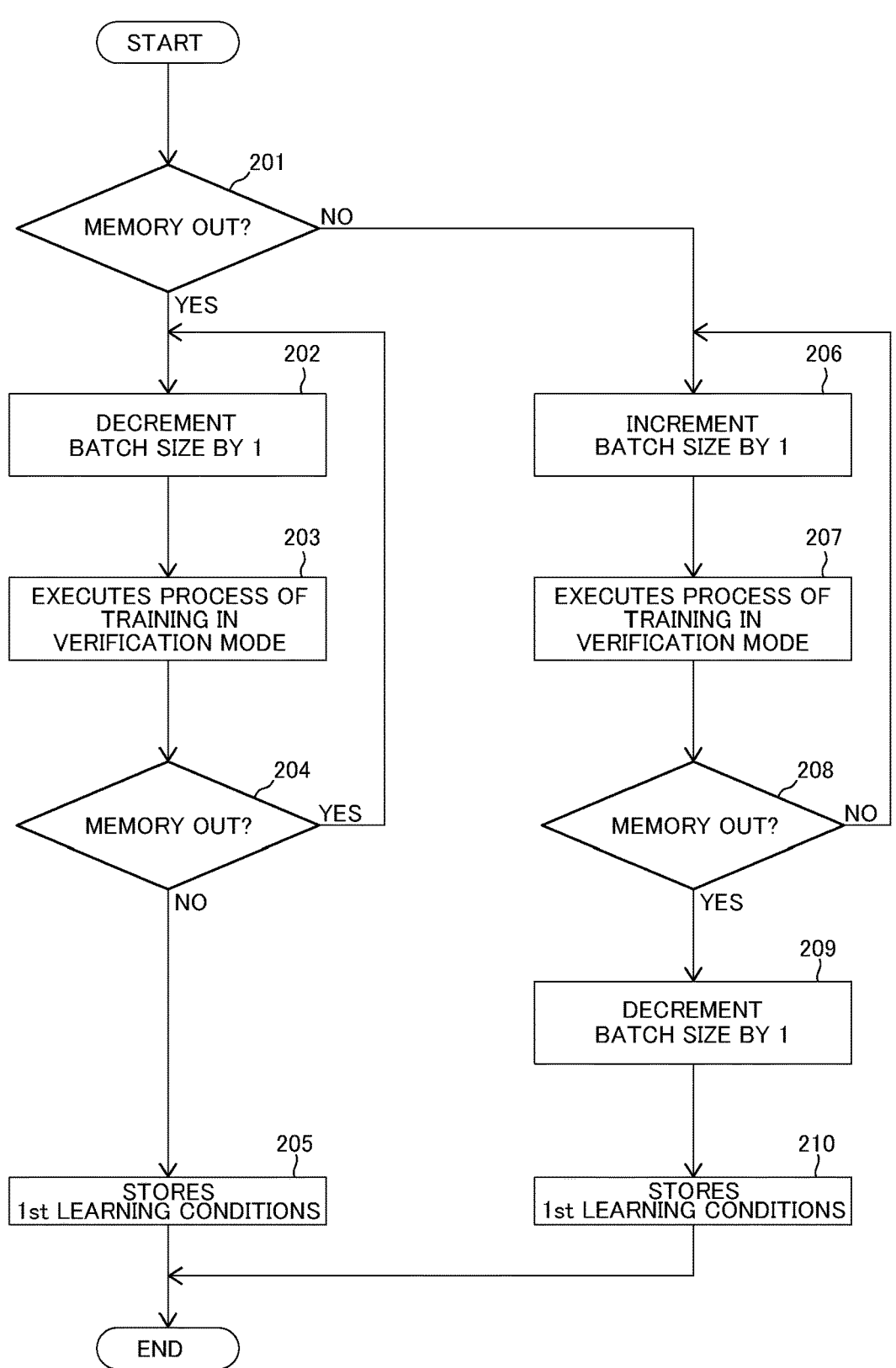
FIG. 9 is a flowchart illustrating processing of optimizing first learning conditions while changing a batch size in the image processing apparatus according to this embodiment.

A configuration of the image processing apparatus 100 according to this embodiment that optimizes the first learning conditions 22 (see FIG. 1) is now described with reference to FIG. 9. The optimization process for the first learning condition 22 shown in FIG. 9 is executed after the process of training is executed once in the verification mode.

In step 201, the determiner 12*d* (see FIG. 3) determines whether out-of-memory (memory out) occurs in the memory 10*b* in the process of training in the verification mode. If out-of-memory occurs, the procedure goes to step 202. If no out-of-memory occurs, the procedure goes to step 206.

In step 202, the learning condition changer 12*b* (see FIG. 3) decrements the batch size 22*c* by one.

In step 203, the learning processor 10 executes the process of training in the verification mode under the first learning conditions 222 (see FIG. 3) that includes the batch size 22*c* decremented by one.

In step 204, the determiner 12*d* determines whether out-of-memory (memory out) occurs in the memory 10*b* in the process of training in the verification mode under the first learning conditions 222 including the batch size 22*c* that is decremented by one in step 203. If out-of-memory occurs in the memory 10*b*, the procedure goes to step 202. If no out-of-memory occurs in the memory 10*b*, the procedure goes to step 205.

In step 205, the learning condition register 12*a* (see FIG. 3) stores the first learning conditions 222 in the storage 13 (see FIG. 1). After that, the procedure ends. In other words, the processes of steps 202 to 205 correspond to processing of acquisition of the optimal batch size 22*c* acquired by repeatedly executing the process of training in the verification mode while decrementing the batch size 22*c*.

If the procedure goes from step 201 to step 206, the learning condition changer 12*b* (see FIG. 3) increments the batch size 22*c* by one in step 206.

In step 207, the learning processor 10 executes the process of training in the verification mode under the first learning conditions 222 (see FIG. 3) that includes the batch size 22*c* incremented by one.

In step 208, the determiner 12*d* determines whether out-of-memory (memory out) occurs in the memory 10*b* in the process of training in the verification mode under the first learning conditions 222 including the batch size 22*c* that is incremented by one in step 207. If out-of-memory occurs in the memory 10*b*, the procedure goes to step 209. If no out-of-memory occurs in the memory 10*b*, the procedure goes to step 206.

In step 209, the learning condition changer 12*b* (see FIG. 3) decrements the batch size 22*c* by one.

In step 210, the learning condition register 12*a* (see FIG. 3) stores the first learning conditions 222 including the batch size 22*c* that is decremented by one in step 209 in the storage 13 (see FIG. 1). After that, the procedure ends. In other words, the processes of steps 206 to 210 correspond to processing of acquisition of the optimal batch size 22*c* acquired by repeatedly executing the process of training in the verification mode while incrementing the batch size 22*c*.

Advantages of the Embodiment

In this embodiment, the following advantages are obtained.

In this embodiment, as discussed above, a memory capacity determination system 200 in learning of cell images 80 includes a learning processor 10 including a processor (first processor 10*a*) configured to execute a predetermined number of processes of training a learning model 21 by using cell images 80 under first learning conditions 22, and a memory 10*b* configured to be used as a work area for executing processes of training the learning model 21; a selector 45 configured to select between a training mode of training the learning model 21 by executing processes of training by using the learning processor 10, and a validation mode of validating whether a capacity of the memory 10*b* becomes insufficient in a process of training by using the learning processor 10; a determiner 12*d* configured to determine whether the capacity of the memory 10*b* becomes insufficient in the process of training the learning model 21 in the verification mode; and an informer (display 121) configured to give a notice based on a determination result (first determination result 32) of the determiner 12*d*.

Here, the capacity of memory 10*b* allocated as a working area 50 is equal in both the learning mode and the verification mode. Accordingly, it can be determined whether the capacity of the memory 10*b* becomes insufficient for the learning mode by validating whether the capacity of the memory used as a work area becomes insufficient in the verification mode of validating whether a capacity of the memory 10*b* used as a work area becomes insufficient in the process of training the learning model 21. In addition, a result (first delimitation result 32) of the determination whether the capacity of the memory 10*b* becomes insufficient is given. Accordingly, users can validate whether the capacity of the memory used as a work area becomes insufficient in the verification mode before training the learning model 21 in the learning mode, and can grasp whether the capacity of the memory 10*b* used as a work area becomes insufficient before training the learning model in the learning mode. As a result, users can grasp insufficient memory capacity that causes abnormal ending of machine learning. In addition, because the learning mode or the verification mode can be selected, it is possible to train the learning model 21 in the learning mode without learning processing in the verification mode in a case in which it is unnecessary to validate whether the capacity of the memory used as a work area becomes insufficient in the verification mode. Consequently, user usability can be improved.

In this embodiment, as discussed above, a memory capacity determination method in learning of cell images 80 includes a step of executing a predetermined number of processes of training a learning model 21 by using cell images 80 under first learning conditions 22; a step of selecting between a training mode of training the learning model 21 by executing processes of training the learning model 21, and a validation mode of validating whether a capacity of a memory 10*b* used as a working area becomes insufficient in a process of training the learning model 21; a step of determining whether the capacity of the memory 10*b* becomes insufficient in the process of training the learning model 21 in the verification mode; and a step of giving a result (first determination result 32) of the determination whether the capacity of the memory 10*b* becomes insufficient.

Accordingly, similar to the memory capacity determination system 200 in learning of cell images 80, it is possible to provide a memory capacity determination method in learning of cell images 80 capable of allowing users to grasp insufficient memory capacity that causes abnormal ending of machine learning.

In addition, following additional advantages can be obtained by the aforementioned embodiment added with configurations discussed below.

That is, in this embodiment, as discussed above, the learning processor 10 is configured to execute, in verification mode, the process of training the number of which is smaller than the number of processes of training in the learning mode. As a result, it is possible to reduce time required for the process of training in the verification mode as compared to time required for the processes of training in the learning mode. Consequently, it is possible to reduce time required to determine whether a capacity of the memory 10*b* is insufficient.

In this embodiment, as described above, the learning processor 10 is configured to execute a single process of training in the verification mode. As a result, it is possible to further reduce time required for the process of training in the verification mode. Consequently, it is possible to further reduce time required to determine whether a capacity of the memory 10*b* is insufficient.

In this embodiment, as discussed above, an image size increaser 12*c* configured to increase a size 22*b* of the cell image 80 is further provided; and the learning processor 10 is configured to execute the process of training in the verification mode by using the cell image 80*a* the size of which is increased by the image size increaser 12*c*. Accordingly, it is possible to increase a capacity of the memory 10*b* allocated for the working area 50 in the process of training in the verification mode. As a result, because the process of training in the verification mode can be executed while a sufficient capacity of the memory 10*b* for the working area 50 is kept, conditions for determination whether the capacity of the memory 10*b* becomes insufficient can be strict. Consequently, the process of training the learning model 21 in the verification mode can be executed under more strict conditions, and it is possible to easily prevent that the capacity of the memory 10*b* in the training mode becomes insufficient.

In this embodiment, as discussed above, a storage 13 configured to store second learning conditions 24 under which the process of training was executed in the verification mode, and a determination result (second determination result 33) corresponding to the second learning conditions 24 is further provided; the determiner 12*d* is configured to determine whether the same conditions as the first learning conditions 22 are stored as the second learning conditions 24 in the storage 13; the learning processor 10 is configured not to execute the process of training in the verification mode if the same conditions as the first learning conditions 22 are stored as the second learning conditions 24 in the storage 13; and the informer (display 121) is configured to display, if the same conditions as the first learning conditions 22 are stored as the second learning conditions 24 in the storage 13, the determination result (second determination result 33) corresponding to the second learning conditions 24 that are same as the first learning conditions. Accordingly, in a case in which the verification was executed under the same second learning conditions 24 as the first learning conditions 22, a notice corresponding to the second determination result 33 can be given without the process of training in the verification mode. As a result, it is possible to notify users whether the capacity of the memory 10*b* becomes insufficient without executing the process of training in the verification mode. Consequently, it is possible to prevent that the process of training in the verification mode under the same first learning conditions 22 is duplicated.

In this embodiment, as discussed above, the informer (display 121) is configured to give additional information 30*c* that urges the user to reduce the number of images (batch size 22*c*) of the cell images 80 in the first learning conditions 22 if the capacity of the memory 10*b* becomes insufficient. Accordingly, it is possible to inform a user that the number of images (batch size 22*c*) of the cell images 80 in the first learning conditions 22 is necessarily reduced to prevent that the capacity of the memory 10*b* becomes insufficient. As a result, because the user can grasp the condition in the first learning conditions 22 that prevents the capacity of the memory 10*b* from becoming insufficient, the user can easily adjust the first learning conditions 22 even if the user is not experienced.

In this embodiment, as discussed above, the informer (display 121) is configured to give additional information 30*d* that urges the user to reduce the size 22*b* of the cell image 80 in the first learning conditions 22 if the capacity of the memory 10*b* becomes insufficient. Accordingly, it is possible to inform a user that the number of images (batch size 22*c*) in the cell images 80 is necessarily reduced in addition to the number of images (batch size 22*b*) of the cell images 80. As a result, the user can more easily adjust the first learning conditions 22 to prevent the capacity of the memory 10*b* from becoming insufficient even if the user is not experienced.

In this embodiment, as discussed above, an estimator 11 configured to use the memory 10*b* to execute, when the processes of training are executed by the learning processor 10 in the verification mode, processing of estimation of the cell image 80 by using a learned model 25 that has learned in parallel to the processes of training executed by the learning processor 10 is further provided. Accordingly, because processing of estimation of the cell image 80 by using a learned model 25 is executed in parallel to the processes of training the learning model 21, it is possible to the process of training in the verification mode with a load of the memory 10*b* being increased as compared to a case in which only the processes of training the learning model 21 are executed. Consequently, even if processing of estimation by using a learned model 25 is executed in parallel to the processes of training the learning model 21, it is possible to prevent that the capacity of the memory 10*b* in the training mode becomes insufficient.

In this embodiment, as discussed above, a learning-condition changer 12*b* configured to change one or more of the first learning conditions 22 is further provided; the learning processor 10 is configured to repeatedly execute the process of training in the validation mode while the learning condition changer 12*b* changes the one or more of the first learning conditions 22; and the determiner 12*d* is configured to acquire the optimal learning conditions for preventing that the capacity of the memory 10*b* becomes insufficient as optimal first learning conditions 22 based on the determination results (first determination result) 32. Because the optimal first learning conditions 22 that prevent the capacity of the memory 10*b* from becoming insufficient are acquired, the processes of training the learning model 21 in the training mode can be executed under the optimal first learning conditions 22 irrespective of experiences of users.

In this embodiment, as discussed above, the learning condition changer 12*b* is configured to change the number of images (batch size 22*c*) of the cell images 80 in the first learning conditions 22; and the determiner 12*d* is configured to acquire the maximum the number of images (batch size 22c) of the cell images 80 for preventing that the capacity of the memory 10b becomes insufficient as the optimal first learning conditions 22. Accordingly, the processes of training the learning model 21 in the training mode can be executed under a condition of the maximum the number of images (batch size 22c) of the cell images 80 for preventing that the capacity of the memory 10b becomes insufficient. Consequently, it is possible to improve the learning accuracy of the learning model 21 while preventing that the capacity of the memory 10b becomes insufficient.

In this embodiment, as discussed above, a learning condition register 12a configured to register the first learning conditions 22 that include a type 22a of learning model 21, the number of images (batch size 22c) of the cell images 80 used to train the learning model 21, a size 22b of the cell image 80, and the number of identification classes 22d into which the learning model 21 learns is further provided. As a result, it is possible to determine whether the capacity of the memory 10b becomes insufficient when the learning model 21 is trained under conditions of the type 22a of learning model 21, the number of images (batch size 22c) of the cell images 80 used to train the learning model 21, the size 22b of the cell image 80, and the number of identification classes 22d into which the learning model 21 learns that are registered.

Modified Embodiments

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

Figure 10:
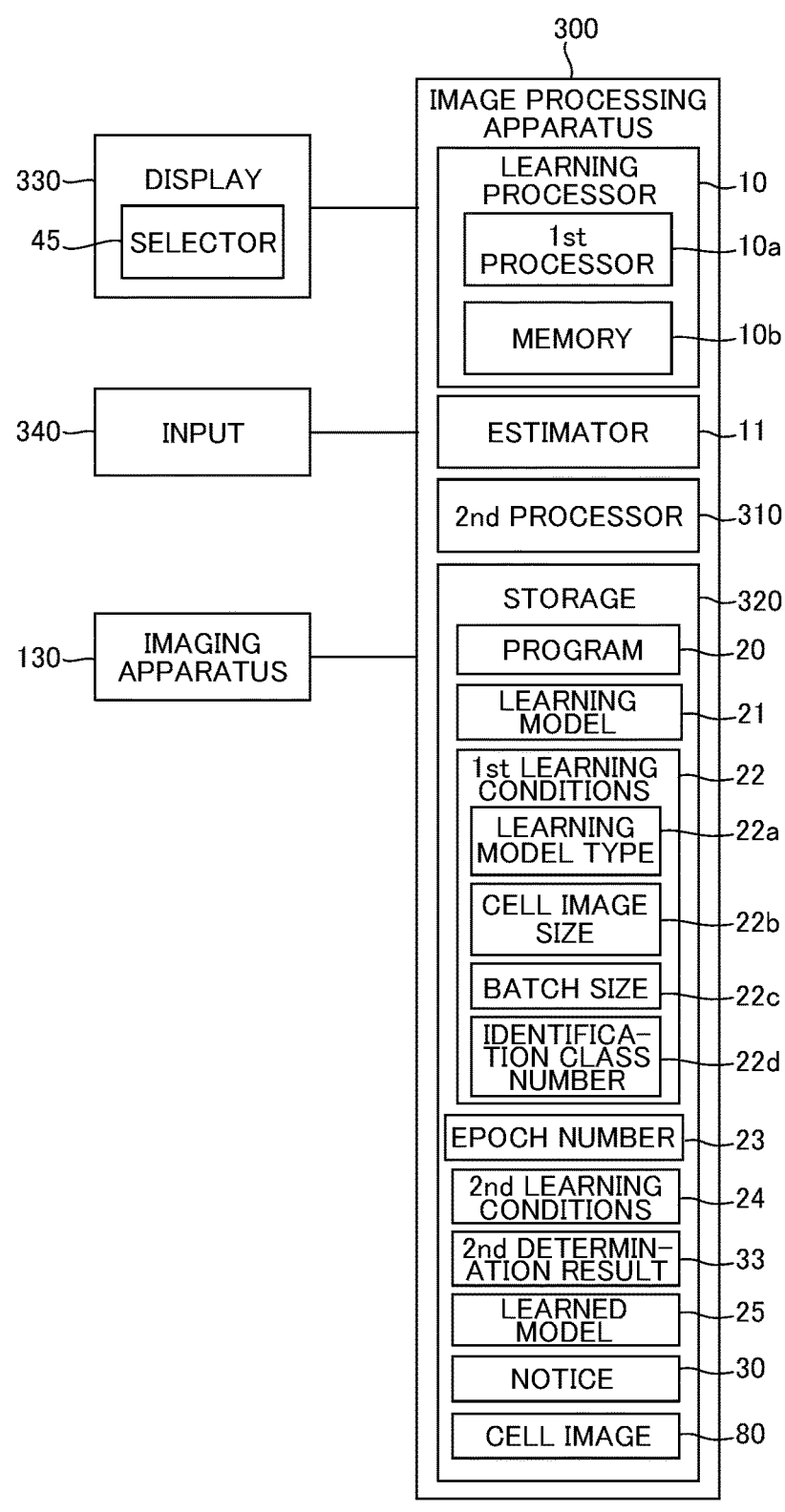
FIG. 10 is a block diagram a memory capacity determination system including an image processing apparatus according to a modified embodiment.

While the example in which the image processing apparatus 100 serves as the memory capacity determination system 200 in learning of cell images 80 constructed of a client-server model has been shown in the aforementioned embodiment, the present invention is not limited to this. In the present invention, the image processing apparatus 100 can be constructed of an independent computer, for example, as shown in FIG. 10. The image processing apparatus 100 shown in FIG. 10 includes a computer 300 including a second processor 310 and a storage 320. The display 330 and the input 340 are connected to the computer 300. The computer 300 is connected to and can communicate with an imaging apparatus 130. The second processor 310 of the computer 300 includes a learning condition register 12a, a learning condition changer 12b, an image size increaser 12c, a determiner 12d and a notice acquirer 12e shown in the aforementioned embodiment (see FIG. 3) as functional blocks.

While the example in which the single second processor 12 (310) executes functions of the learning condition register 12a, the learning condition changer 12b, the image size increaser 12c, the determiner 12d and the notice acquirer 12e as functional blocks has been shown in the aforementioned embodiment and in the modified embodiment shown in FIG. 10, the present invention is not limited to this. A plurality of processors may share processing of determination whether a capacity of the memory 10b becomes insufficient in learning of the cell images 80. Each operation may be executed by a separate processor. The plurality of processors may be included in independent computers. In other words, the image processing apparatus 100 may be constructed of a plurality of computers.

While the example in which the learning processor 10 is configured to execute, in the verification mode, the process(es) of training the number of which is smaller than the number of processes of training in the learning mode has been shown in the aforementioned embodiment, the present invention is not limited to this. For example, the learning processor 10 may be configured to execute, in verification mode, the processes of training the number of which is equal to or greater than the number of processes of training in the learning mode. For example, the learning processor 10 executes, in verification mode, the processes of training the number of which is equal to or greater than the number of processes of training in the learning mode, time required for determination whether a capacity of the memory 10b becomes insufficient becomes longer. For this reason, the learning processor 10 is preferably configured to execute, in the verification mode, the processes of training the number of which is smaller than the number of processes of training in the learning mode.

While the example in which the learning processor 10 is configured to execute the process of training in the verification mode by using the cell image 80a the size of which is increased by the image size increaser 12c has been shown in the aforementioned embodiment, the present invention is not limited to this. For example, the learning processor 10 may be configured to execute the process of training in the verification mode by using the cell image 80 instead of the size-increased cell image 80a. In this case, the second processor 12 may not include the image size increaser 12c.

While the example in which the learning processor 10 is configured not to execute, if the same conditions as the first learning conditions 22 are stored as the second learning conditions 24 in the storage 13, the process of training in the verification mode under the first learning conditions 22 has been shown in the aforementioned embodiment, the present invention is not limited to this. For example, the learning processor 10 is configured to execute, even if the same conditions as the first learning conditions 22 are stored as the second learning conditions 24 in the storage 13, the process of training in the verification mode under the first learning conditions 22. However, in a case in which the learning processor 10 is configured to execute, even if the same conditions as the first learning conditions 22 are stored as the second learning conditions 24 in the storage 13, the process of training in the verification mode under the first learning conditions 22, an unnecessary process of training in the verification mode is executed. For example, the learning processor 10 is preferably configured not to execute, if the same conditions as the first learning conditions 22 are stored as the second learning conditions 24 in the storage 13, the process of training in the verification mode under the first learning conditions 22.

While the example in which the memory capacity determination system 200 includes the estimator 11 configured to use the memory 10b to execute, when the processes of training are executed by the learning processor 10 in the verification mode, processing of estimation of the cell image 80 by using a learned model 25 in parallel to the processes of training executed by the learning processor 10 has been shown in the aforementioned embodiment, the present invention is not limited to this. For example, the memory capacity determination system 200 may not include the estimator 11.

Also, While the example in which the memory capacity determination system 200 includes the learning condition changer 12b, and the learning processor 10 is configured to repeatedly execute the process of training in the validation mode while the learning condition changer 12b changes the one or more of the first learning conditions 22 has been shown in the aforementioned embodiment, the present invention is not limited to this. For example, the learning processor 10 may be configured to modify the first learning condition 22 by the learning condition changer 12b while not repeating the process of training in the verification mode. In this case, the memory capacity determination system 200 does not need to have a learning condition changer 12b.

While the example in which the determiner 12d is configured to acquire the maximum batch size 22c of the cell images 80 for preventing that the capacity of the memory 10b becomes insufficient as the optimal first learning conditions 22 has been shown in the aforementioned embodiment, the present invention is not limited to this. For example, the determiner 12d may be configured to acquire the maximum size of the cell images 80 that prevents the capacity of the memory 10b from becoming insufficient as the optimal first learning conditions 22.

While the example in which the first processor 10a and the estimator 11 are constructed of different processors has been shown in the aforementioned embodiment, the present invention is not limited to this. For example, the first processor 10a and the estimator 11 may be constructed of a common processor.

While the example in which the image processing apparatus 100 is configured to train the learning model 21 and to analyze the cell images 80 has been shown in the aforementioned embodiment, the present invention is not limited to this. For example, the image processing apparatus 100 may be configured as a training device that only trains the learning model 21.

While the example in which the image processing apparatus 100 trains the learning model 21 to classify cells included in the cell images 80 has been shown in the aforementioned embodiment, the present invention is not limited to this. For example, the image processing apparatus 100 may be configured to train the learning model to improve resolution of cells included in the cell images 80. Users can specify a training type of a learning model executed by the image processing apparatus 100 on an as needed basis of the users.

Modes

The aforementioned exemplary embodiment will be understood as concrete examples of the following modes by those skilled in the art.

Mode Item 1

A memory capacity determination system in learning of cell images includes a learning processor including a processor configured to execute a predetermined number of processes of training a learning model by using cell images under a first learning condition(s), and a memory configured to be used as a working area for executing processes of training the learning model; a selector configured to select between a training mode of training the learning model by executing processes of training by using the learning processor, and a validation mode of validating whether a capacity of the memory becomes insufficient in a process(es) of training by using the learning processor; a determiner configured to determine whether the capacity of the memory becomes insufficient in the process(es) of training the learning model in the verification mode; and an informer configured to give a notice based on a determination result of the determiner.

Mode Item 2

In the memory capacity determination system in learning of cell images according to mode item 1, the learning processor is configured to execute, in the verification mode, the process(es) of training the number of which is smaller than the number of processes of training in the learning mode.

Mode Item 3

In the memory capacity determination system in learning of cell images according to mode item 2, the learning processor is configured to execute a single process of training in the verification mode.

Mode Item 4

In the memory capacity determination system in learning of cell images according to any of mode items 1 to 3, an image size increaser configured to increase a size of the cell image is further provided, wherein the learning processor is configured to execute, in the verification mode, the process(es) of training by using the cell image the size of which is increased by the image size increaser.

Mode Item 5

In the memory capacity determination system in learning of cell images according to any of mode items 1 to 4, a storage configured to store a second learning condition(s) r which the process(es) of training was/were executed in the verification mode, and a determination result(s) corresponding to the second learning condition(s) is further provided, wherein the determiner is configured to determine whether the same condition(s) as the first learning condition(s) are stored as the second learning condition(s) in the storage; the learning processor is configured not to execute the process(es) of training in the verification mode if the same condition(s) as the first learning condition(s) is/are stored as the second learning condition(s) in the storage; and the informer is configured to give, if the same condition(s) as the first learning condition(s) is/are stored as the second learning condition(s) in the storage, the determination result(s) corresponding to the second learning condition(s) that is/are same as the first learning condition(s).

Mode Item 6

In the memory capacity determination system in learning of cell images according to any of mode items 1 to 5, the informer is configured to give information that urges a user to reduce a batch size of the cell images in the first learning condition(s) if the capacity of the memory becomes insufficient.

Mode Item 7

In the memory capacity determination system in learning of cell images according to mode item 6, the informer is configured to give additional information that urges the user to reduce the size of the cell image in the first learning condition(s) if the capacity of the memory becomes insufficient.

Mode Item 8

In the memory capacity determination system in learning of cell images according to any of mode items 1 to 7, an estimator configured to use the memory to execute, when the process(es) of training is/are executed by the learning processor in the verification mode, processing of estimation of the cell image by using a learned model that has learned in parallel to the process(es) of training executed by the learning processor is further provided.

Mode Item 9

In the memory capacity determination system in learning of cell images according to any of mode items 1 to 8, a learning-condition changer configured to change the first learning condition, or one or more of the first learning conditions is further provided, wherein the learning processor is configured to repeatedly execute the process(es) of training in the validation mode while the learning condition changer changes the first learning condition, or the one or more of the first learning conditions; and the determiner is configured to acquire an optimal learning condition(s) for preventing that the capacity of the memory becomes insufficient as an optimal first learning condition(s) based on the determination result(s) of the determiner.

Mode Item 10

In the memory capacity determination system in learning of cell images according to mode item 9, the learning condition changer is configured to change a batch size of the cell images in the first learning condition(s); and the determiner is configured to acquire a maximum batch size of the cell images for preventing that the capacity of the memory becomes insufficient as the optimal first learning condition(s).

Mode Item 11

In the memory capacity determination system in learning of cell images according to any of mode items 1 to 10, a learning condition register configured to register the first learning conditions that include a type of learning model, a batch size of the cell images used to train the learning model, a size of the cell image, and the number of identification classes into which the learning model learns.

Mode Item 12

A memory capacity determination method in learning of cell images includes a step of executing a predetermined number of processes of training a learning model by using cell images under a first learning condition(s); a step of selecting between a training mode of training the learning model by executing processes of training the learning model, and a validation mode of validating whether a capacity of a memory used as a working area becomes insufficient in a process(es) of training the learning model; a step of determining whether the capacity of the memory becomes insufficient in the process(es) of training the learning model in the verification mode; and a step of giving a result of the determination whether the capacity of the memory becomes insufficient.

DESCRIPTION OF REFERENCE NUMERALS

10; learning processor
10*a*; first processor
10*b*; memory
12*a*; learning condition register
12*b*; learning condition changer
12*c*; image size increaser
12*d*; determiner
13; storage
21; learning model
22; first learning conditions
22*a*; type of learning model
22*b*; size of cell image
22*c*; batch size (number of cell images)
22*d*; number of identification classes
23; epoch number (predetermined number)
24; second learning conditions
25; learned model
32; first determination result (determination result)
33; second determination result (determination result)
45; selector
45*a*; verification button
45*b*; learning-start button
50; working area
80; cell image
80*a*; size-increased cell image
121, 330; display (informer)
200; memory capacity determination system in learning of cell images

The invention claimed is:

1. A memory capacity determination system in learning of cell images comprising:

a learning processor including a processor configured to execute a predetermined number of processes of training a learning model by using cell images under a first learning condition(s), and a memory configured to be used as a working area for executing processes of training the learning model;

a selector configured to select between a training mode of training the learning model by executing processes of training by using the learning processor, and a validation mode of validating whether a capacity of the memory becomes insufficient in a process(es) of training by using the learning processor;

a determiner configured to determine whether the capacity of the memory becomes insufficient in the process(es) of training the learning model in the verification mode; and an informer configured to give a notice based on a determination result of the determiner.

2. The memory capacity determination system in learning of cell images according to claim 1, wherein the learning processor is configured to execute, in the verification mode, the process(es) of training the number of which is smaller than the number of processes of training in the learning mode.

3. The memory capacity determination system in learning of cell images according to claim 2, wherein the learning processor is configured to execute a single process of training in the verification mode.

4. The memory capacity determination system in learning of cell images according to claim 1 further comprising an image size increaser configured to increase a size of the cell image, wherein the learning processor is configured to execute, in the verification mode, the process(es) of training by using the cell image the size of which is increased by the image size increaser.

5. The memory capacity determination system in learning of cell images according to claim 1 further comprising a storage configured to store a second learning condition(s) under which the process(es) of training was/were executed in the verification mode, and a determination result(s) corresponding to the second learning condition(s), wherein the determiner is configured to determine whether the same condition(s) as the first learning condition(s) are stored as the second learning condition(s) in the storage;

the learning processor is configured not to execute the process(es) of training in the verification mode if the same condition(s) as the first learning condition(s) is/are stored as the second learning condition(s) in the storage; and the informer is configured to give, if the same condition(s) as the first learning condition(s) is/are stored as the second learning condition(s) in the storage, the determination result(s) corresponding to the second learning condition(s) that is/are same as the first learning condition(s).

6. The memory capacity determination system in learning of cell images according to claim 1, wherein the informer is configured to give information that urges a user to reduce the number of the cell images in the first learning condition(s) if the capacity of the memory becomes insufficient.

7. The memory capacity determination system in learning of cell images according to claim 6, wherein the informer is configured to give additional information that urges the user to reduce the size of the cell image in the first learning condition(s) if the capacity of the memory becomes insufficient.

8. The memory capacity determination system in learning of cell images according to claim 1 further comprising an estimator configured to use the memory to execute, when the process(es) of training is/are executed by the learning processor in the verification mode, processing of estimation of the cell image by using a learned model that has learned in parallel to the process(es) of training executed by the learning processor.

9. The memory capacity determination system in learning of cell images according to claim 1 further comprising a learning-condition changer configured to change the first learning condition, or one or more of the first learning conditions, wherein the learning processor is configured to repeatedly execute the process(es) of training in the validation mode while the learning condition changer changes the first learning condition, or the one or more of the first learning conditions; and the determiner is configured to acquire an optimal learning condition(s) for preventing that the capacity of the memory becomes insufficient as an optimal first learning condition(s) based on the determination result(s) of the determiner.

10. The memory capacity determination system in learning of cell images according to claim 9, wherein the learning condition changer is configured to change the number of the cell images in the first learning condition(s); and the determiner is configured to acquire a maximum number of the cell images for preventing that the capacity of the memory becomes insufficient as the optimal first learning condition(s).

11. The memory capacity determination system in learning of cell images according to claim 1 further comprising a learning condition register configured to register the first learning conditions that include a type of learning model, the number of the cell images used to train the learning model, a size of the cell image, and the number of identification classes into which the learning model learns.

12. A memory capacity determination method in learning of cell images comprising:

a step of executing a predetermined number of processes of training a learning model by using cell images under a first learning condition(s);

a step of selecting between a training mode of training the learning model by executing processes of training the learning model, and a validation mode of validating whether a capacity of a memory used as a working area becomes insufficient in a process(es) of training the learning model;

a step of determining whether the capacity of the memory becomes insufficient in the process(es) of training the learning model in the verification mode; and a step of giving a result of the determination whether the capacity of the memory becomes insufficient.

* * * * *